3,035,894
METHOD OF PREPARING URANIUM PENTAFLUORIDE
Willard E. Hobbs, Oak Ridge, Tenn., assignor to the United States of America as represented by the United States Atomic Energy Commission
No Drawing. Filed July 7, 1960, Ser. No. 41,460
7 Claims. (Cl. 23—14.5)

My invention relates to a method of preparing uranium pentafluoride from uranium hexafluoride.

A convenient large-scale method for the conversion of gaseous $UF_6$ to a lower fluoride of uranium in solid form is desired in order to facilitate recovery and storage of $UF_6$ obtained in uranium isotope separation by means of gaseous diffusion. Separation of product $UF_6$ enriched in the fissionable uranium 235 isotope from various gaseous contaminants in the gaseous diffusion product stream could be effected by converting the $UF_6$ to a solid such as $UF_5$ and removing the remaining gases. Uranium metal could then be prepared from the $UF_5$ more readily than from $UF_6$. Storage of the large quantities of $UF_6$ depleted in uranium 235 obtained as by-product of gaseous diffusion separation at present requires expensive pressurized cylinders. Conversion of this $UF_6$ to solid $UF_5$ would allow more convenient storage of these uranium values and recovery of a portion of the fluorine content in the form of hydrogen fluoride.

In addition, a source of high-purity $UF_5$ is needed for numerous purposes. $UF_5$ has been identified as a component of corrosion products resulting from contacting $UF_6$ at elevated temperatures with certain metals such as nickel, aluminum, iron, copper and their alloys. Further information on properties of $UF_5$ such as vapor pressure, melting point and dissociation pressure would help to provide an understanding of the mechanisms involved and would thus be of assistance in the solution of $UF_6$ corrosion problems. Studies of the system $$UF_6-UF_5-UF_4$$

would also provide information useful to numerous chemical reactions involving $UF_6$ and $UF_4$ which are currently carried out in the nuclear energy field. In order that these studies may be carried out, substantial quantities of $UF_5$ having a high degree of purity, i.e., over 95 percent, are required.

Various methods have been employed for the preparation of $UF_5$, but serious disadvantages are presented in the use of these methods. $UF_5$ has been prepared by the reaction of $UF_6$ with $UF_4$. This reaction, however, proceeds extremely slowly and presents difficulty in the attainment of a high-purity product. The reaction of $UF_4$ with fluorine proceeds more quickly than the $UF_6$—$UF_4$ reaction, but a reaction time of several hours is still required and product purity is also low in this method. In another method $UF_5$ is prepared by the reaction of uranium pentachloride with hydrogen fluoride, but this reaction also proceeds slowly and is thus unsuitable for the preparation of large quantities of $UF_5$.

It is, therefore, an object of my invention to provide a method of preparing uranium pentafluoride.

Another object is to provide a convenient method of preparing large quantities of high-purity $UF_5$.

Another object is to provide a large-scale method for the conversion of $UF_6$ to $UF_5$.

Other objects and advantages of my invention will be apparent from the following detailed description and claims appended hereto.

In accordance with my invention $UF_5$ is prepared by contacting gaseous $UF_6$ with gaseous hydrogen bromide at a $UF_6$ to HBr molar ratio of at least approximately 1.7. This reaction proceeds rapidly on a large scale to yield $UF_5$ at a purity of 95 percent or better. Large quantities of $UF_5$ may be prepared by this means without encountering the problems presented by the methods previously employed.

The most critical feature in preparing $UF_5$ by this method is the avoidance of localized areas of high HBr concentration which result in the formation of substantial amounts of $UF_4$ or the intermediate fluorides $U_2F_9$ and $U_4F_{17}$. This is accomplished by the use of excess $UF_6$ and by contacting the reagents in such a manner as to disperse the HBr thoroughly. In order to obtain a high-purity product, excess $UF_6$ at a molar ratio of at least approximately 1.7 moles per mole of HBr is required, and a ratio of approximately 2 moles $UF_6$ per mole HBr is preferred. Although the upper limit of the $UF_6$ excess is not critical, no further advantage is shown at $UF_6$/HBr ratios over 2.

The reaction of $UF_6$ and HBr may be carried out over a wide range of temperatures from room temperature to 250° C. At the lower temperatures within this range the yield of $UF_5$ is decreased because of the low partial pressure of $UF_6$ in the reaction mass, and at the higher temperatures the product $UF_5$ may be partially lost because of its instability. It is accordingly preferred to employ an intermediate temperature within the range of 75° C. to 150° C. The reaction temperature may be varied to obtain $UF_5$ with either the alpha or beta crystal structure, this designation being in accordance with the information disclosed in "The Chemistry of Uranium," by Katz and Rabinowitch, at pages 388–390. At temperatures below 125° C. $UF_5$ is obtained principally in the beta form, and at temperatures over 150° C. alpha $UF_5$ is obtained. Temperatures in the intermediate 125° C. to 150° C. range result in a mixture of the two forms. The alpha form may also be obtained by conducting the reaction at a temperature below 125° C. and maintaining the product receiver at a temperature over 150° C. Although the two forms exhibit no significant difference in chemical properties, it may be desirable to prepare a particular form, especially for research purposes.

In order to avoid formation of lower uranium fluorides the reactants must be contacted in such a manner as to avoid localized areas with high concentration of HBr in the reaction mass. In the preparation of small quantities of $UF_5$ the reactants may be suitably contacted by slowly introducing a stream of HBr into a vessel containing $UF_6$. Laboratory-scale preparation may also be accomplished by freezing the reactants separately and allowing them to increase to room temperature, with the resulting gaseous HBr being introduced into the $UF_6$ container. For large-scale operation conventional gas contacting apparatus may be employed, with the reactant streams being mixed rapidly upon introduction into a reactor. The contact time required for a complete reaction varies with the temperature and apparatus employed. For the small-scale techniques described above up to 30 minutes may be required, but with large-scale gas contacting equipment the reaction is substantially completed in less than one minute. The reactant gas partial pressures are not critical, and a $UF_6$ partial pressure from approximately one-sixth atmosphere to two atmospheres at the reaction temperature may be employed, with the HBr pressure being varied to provide the desired ratio. In addition to $UF_5$, gaseous bromine and hydrogen fluoride are produced in the reaction. These products may be readily separated from the solid $UF_5$ product by pumping and may be recovered from the effluent gas.

Since the presence of water results in undesirable side reactions the reaction must be carried out under anhydrous conditions. In addition, the product $UF_5$ hydrolyzes readily in the presence of water so that the product must also be stored under anhydrous conditions.

Although the particular apparatus employed for the process of my invention is not critical, the apparatus must be resistant to the extreme corrosive action of $UF_6$ and HF. Examples of suitable materials of construction are fluorinated plastics available commercially under the trade names "Teflon" and "Fluorothene" and metals such as copper, nickel and aluminum.

My invention is further illustrated by the following specific example.

*Example I*

$UF_5$ was prepared in two large-scale runs by reacting gaseous $UF_6$ and HBr. The runs were conducted in a nickel tower reactor three feet long by three inches in diameter, with the reactants being introduced at the top of the reactor and the product being collected in a receiver at the bottom. The $UF_6$ was introduced by means of a one-inch tube, and the HBr was introduced through a ¼-inch tube drawn to a nozzle and disposed concentric within the $UF_6$ tube. In the first run the $UF_6$ was introduced from a storage cylinder at a temperature of 65° C. and the HBr was introduced from a separate cylinder at room temperature. The reactor was maintained at a temperature of 80° C. by means of external heating coils. The product receiver was also maintained at a temperature of 80° C. The $UF_6$ partial pressure was approximately two-thirds of an atmosphere at 80° C. $UF_6$ was introduced at a flow rate of 352 cubic centimeters per minute and the HBr at a flow rate of 163 cubic centimeters per minute, the molar ratio of $UF_6$ to HBr being 2 to 1. The duration of the run was approximately two and one-half hours. Upon completion of the run 410 grams of product $UF_5$ was recovered from the receiver. The product was examined by means of conventional X-ray diffraction techniques, and the characteristic spectral lines for beta $UF_5$ were principally found. The presence of a slight amount of alpha $UF_5$ was also indicated by the diffraction pattern. The product was then analyzed chemically, with the total uranium content and the quadrivalent uranium formed upon hydrolysis of the product being determined. The ratio of total uranium to $U^{+4}$ was determined to be 1.96, the theoretical value for $UF_5$ being 2.0. The product had a very light brown color and a relatively small particle size. The same procedure was employed in the second run except that the product receiver was maintained at a temperature of 200° C. and the ratio of $UF_6$ to HBr was 2.3 to 1. The product of the second run was almost white with a light blue tinge. The ratio of total uranium to $U^{+4}$ was determined to be 2.08 for the second run product. The total uranium to $U^{+4}$ ratios for both runs indicate a product purity of higher than 95 percent.

The above example is not to be construed as limiting in any manner the scope of my invention, which is limited only as indicated by the appended claims. It is also to be understood that numerous variations in apparatus and procedure may be employed within the scope of my invention.

Having thus described my invention, I claim:

1. The method of preparing $UF_5$ which comprises contacting gaseous $UF_6$ with gaseous hydrogen bromide at a $UF_6$ to HBr molar ratio of at least approximately 1.7 under anhydrous conditions and recovering the $UF_5$ formed thereby.

2. The method of preparing $UF_5$ which comprises intimately contacting gaseous $UF_6$ and gaseous HBr at a $UF_6$ to HBr molar ratio of at least 1.7 under anhydrous conditions and at a temperature under 250° C. and recovering the $UF_5$ formed thereby.

3. The method of preparing $UF_5$ which comprises contacting gaseous $UF_6$ and gaseous HBr at a $UF_6$ to HBr molar ratio of at least approximately 2 under anhydrous conditions and recovering the $UF_5$ formed thereby.

4. The method of claim 3 in which the temperature is within the range of approximately 75° C. to 150° C.

5. The method of claim 3 in which the $UF_6$ partial pressure is within the range of approximately one-sixth to two atmospheres.

6. The method of preparing beta $UF_5$ which comprises contacting gaseous $UF_6$ and gaseous hydrogen bromide at a $UF_6$ to HBr molar ratio of at least 1.7 under anhydrous conditions and at a temperature below approximately 125° C. and recovering the $UF_5$ formed thereby.

7. The method of preparing alpha $UF_5$ which comprises contacting gaseous $UF_6$ and gaseous hydrogen bromide at a $UF_6$ to HBr molar ratio of at least 1.7 under anhydrous conditions and at a temperature within the range of approximately 150° C. to 250° C. and recovering the $UF_5$ formed thereby.

References Cited in the file of this patent

UNITED STATES PATENTS

| | | |
|---|---|---|
| 2,510,850 | Agron et al. | June 6, 1950 |
| 2,567,145 | Carignan | Sept. 4, 1951 |
| 2,638,406 | Tevebaugh et al. | May 12, 1953 |
| 2,768,872 | Klein et al. | Oct. 30, 1956 |

OTHER REFERENCES

Katz et al.: "The Chemistry of Uranium," pages 382–392, 440–442, 448 (1951), McGraw-Hill Book Co., Inc., N.Y.C. Copy in POSL.